US012524584B2

(12) United States Patent
Sawdon et al.

(10) Patent No.: US 12,524,584 B2
(45) Date of Patent: Jan. 13, 2026

(54) VEHICLE OCCUPANT COMFORT ANALYSIS SYSTEMS AND METHODS

(71) Applicants: Theodore C Sawdon, Rochester Hills, MI (US); Anita M Satkiewicz, Troy, MI (US); Yun Lu, Troy, MI (US); Paul J Hogan, Sterling Heights, MI (US)

(72) Inventors: Theodore C Sawdon, Rochester Hills, MI (US); Anita M Satkiewicz, Troy, MI (US); Yun Lu, Troy, MI (US); Paul J Hogan, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 1144 days.

(21) Appl. No.: 17/131,984

(22) Filed: Dec. 23, 2020

(65) Prior Publication Data

US 2022/0198090 A1    Jun. 23, 2022

(51) Int. Cl.
*G06F 30/15* (2020.01)
*B60N 2/06* (2006.01)
*G06F 30/20* (2020.01)

(52) U.S. Cl.
CPC ............... *G06F 30/15* (2020.01); *B60N 2/06* (2013.01); *G06F 30/20* (2020.01)

(58) Field of Classification Search
None
See application file for complete search history.

(56) References Cited

U.S. PATENT DOCUMENTS

| 3,147,617 | A | * | 9/1964 | Kaptur, Jr. | A61B 5/103 |
| | | | | | 73/172 |
| 4,449,752 | A | * | 5/1984 | Yasumatsu | B60N 2/123 |
| | | | | | 297/341 |
| 6,090,148 | A | * | 7/2000 | Weber | G06F 30/15 |
| | | | | | 703/1 |

(Continued)

FOREIGN PATENT DOCUMENTS

| GB | 2333383 A | * | 7/1999 | ............. G06F 30/15 |
| KR | 20090064308 A | | 6/2009 | |

OTHER PUBLICATIONS

Kolich, Mike. "Driver Selected Seat Position: Practical Applications." SAE Transactions, vol. 109, 2000, pp. 965-973. JSTOR, http://www.jstor.org/stable/44686935. (Year: 2000).*

(Continued)

*Primary Examiner* — Akash Saxena
(74) *Attorney, Agent, or Firm* — Jeremy J. Klobucar

(57) ABSTRACT

A computer-implemented method of analyzing postural comfort of an occupant seated on a seat track of a vehicle includes obtaining, at a computing device having one or more processors, a first set of data corresponding to a mannequin definition, obtaining, at the computing device, a second set of data corresponding to reference geometry of an environment of the vehicle, and obtaining, at the computing device, a third set of data corresponding to vehicle occupant comfort guidelines. Including generating, at the computing device, a CAD template with a mannequin model, vehicle reference geometry including the seat track, and comfort (Continued)

guidelines based on the first set of data, the second set of data, and the third set of data, and automatically determining, at the computing device, whether one or more locations on the seat track are a comfortable seating position for the occupant based at least on the third set of data.

17 Claims, 6 Drawing Sheets

(56) References Cited

U.S. PATENT DOCUMENTS

| | | | | |
|---|---|---|---|---|
| 6,354,553 B1 * | 3/2002 | Lagerweij | ............ | B60N 2/0806 |
| | | | | 297/344.1 |
| 6,840,125 B1 | 1/2005 | Reynolds et al. | | |
| 7,295,959 B2 * | 11/2007 | Noma | ............ | G06T 19/00 |
| | | | | 703/8 |
| 7,797,138 B2 | 9/2010 | Reynolds et al. | | |
| 7,881,860 B2 * | 2/2011 | Noma | ............ | G06F 30/15 |
| | | | | 701/117 |
| 9,195,794 B2 | 11/2015 | Dariush | | |
| 9,428,082 B2 | 8/2016 | Hotary et al. | | |
| 10,216,892 B2 | 2/2019 | John et al. | | |
| 2004/0010398 A1 * | 1/2004 | Noma | ............ | G06F 30/15 |
| | | | | 703/1 |
| 2004/0011150 A1 * | 1/2004 | Reynolds | ............ | A47C 31/126 |
| | | | | 296/64 |
| 2006/0095235 A1 * | 5/2006 | Furtado | ............ | G06F 30/15 |
| | | | | 703/1 |
| 2006/0167630 A1 * | 7/2006 | Noma | ............ | G06F 30/15 |
| | | | | 701/117 |
| 2007/0004488 A1 * | 1/2007 | Kirila | ............ | G09B 9/058 |
| | | | | 463/11 |
| 2008/0047770 A1 * | 2/2008 | Breed | ............ | B60T 7/06 |
| | | | | 701/45 |
| 2016/0339801 A1 * | 11/2016 | Pereny | ............ | B60N 2/665 |
| 2017/0103160 A1 * | 4/2017 | Hynes | ............ | G09B 9/058 |
| 2018/0134116 A1 * | 5/2018 | Chen | ............ | B60N 2/976 |
| 2020/0015598 A1 * | 1/2020 | Hondori | ............ | B60N 2/0022 |
| 2021/0076836 A1 * | 3/2021 | Hondori | ............ | B25J 3/04 |

OTHER PUBLICATIONS

Matthew P. Reed, PHD Thesis "Survey of Auto Seat Design Recommendations for Improved Comfort", University of Michigan, pp. 1-79, Apr. 2000. (Year: 2000).*

Jared Gragg, Jingzhou (James) Yang, Brad Howard, Hybrid method for driver accommodation using optimization-based digital human models, Computer-Aided Design, vol. 44, Issue 1 (Year: 2012).*

* cited by examiner

VEHICLE OCCUPANT COMFORT ANALYSIS SYSTEMS AND METHODS

FIELD

The present application relates generally to vehicle occupant comfort and, more particularly, to postural comfort analyses to determine comfortable occupant seating locations.

BACKGROUND

During vehicle design, it can be difficult and time consuming to assess comfortability of a vehicle occupant driving posture for a given vehicle environment. Some conventional tools for this purpose have been complex, inaccurate, and hard to customize. Thus, while current systems do work for their intended purpose, there remains a need for improvement in the relevant art.

SUMMARY

In one example aspect of the invention, a computer-implemented method of analyzing postural comfort of an occupant seated on a seat track of a vehicle is provided. In one exemplary implementation, the method includes obtaining, at a computing device having one or more processors, a first set of data corresponding to a mannequin definition, obtaining, at the computing device, a second set of data corresponding to reference geometry of an environment of the vehicle, and obtaining, at the computing device, a third set of data corresponding to vehicle occupant comfort guidelines. The method further includes generating, at the computing device, a CAD template with a mannequin model, vehicle reference geometry including the seat track, and comfort guidelines based on the first set of data, the second set of data, and the third set of data, and automatically determining, at the computing device, whether one or more locations on the seat track are a comfortable seating position for the occupant based at least on the third set of data.

In addition to the foregoing, the described method may include one or more of the following features: automatically digitizing the seat track with one or more tabulated points; wherein each of the one or more tabulated points are indicative of a predetermined step size on the seat track; at the computing device, visually identifying each of the one or more tabulated points as either a pass/fail comfortable seating position; and automatically outputting, at the computing device, one or more comfortable seating locations and posture angles.

In addition to the foregoing, the described method may include one or more of the following features: generating, at the computing device, an interactive graphical user interface configured to manage additional inputs for the CAD template; wherein the additional inputs include a step size indicative of a desired step size between analysis points on the seat track, a mannequin anthropometry definition, and at least one posture comfort angle definition; wherein the mannequin anthropometry definition includes a population percentile size and a torso angle; and wherein the comfort angle definition includes an ankle angle lower limit, an ankle angle upper limit, a knee angle lower limit, and a knee angle upper limit.

In addition to the foregoing, the described method may include one or more of the following features: wherein the first set of data corresponding to the mannequin definition includes a fully articulated model to represent mannequin body segments; wherein the mannequin body segments include a foot, a lower leg, an upper leg, a torso, and an upper arm of the representative vehicle occupant; wherein the second set of data corresponding to reference geometry of an environment of the vehicle includes a seat travel of a seat to define the seat track; wherein the second set of data further includes reference geometry of an accelerator pedal, a floor curve, a steering wheel, and a steering column of the vehicle; wherein the third set of data corresponding to vehicle occupant comfort guidelines includes one or more joint angles of the vehicle occupant; and wherein the one or more joint angles of the vehicle occupant includes an ankle joint angle, a knee joint angle, a hip joint angle, a shoulder joint angle, an elbow joint angle, and a wrist joint angle.

In another example aspect of the invention, a computing device is provided. In one exemplary implementation, the computing device includes one or more processors and a non-transitory computer-readable storage medium having a plurality of instructions stored thereon, which, when executed by the one or more processors, cause the one or more processors to perform operations including obtain a first set of data corresponding to a mannequin definition, obtain a second set of data corresponding to reference geometry of an environment of the vehicle, obtain a third set of data corresponding to vehicle occupant comfort guidelines, generate a CAD template with a mannequin model, vehicle reference geometry including a seat track, and comfort guidelines based on the first set of data, the second set of data, and the third set of data, and automatically determine whether one or more locations on the seat track are a comfortable seating position for the occupant based at least on the third set of data.

In addition to the foregoing, the described computing device may include one or more of the following features: wherein the operations further comprise automatically digitizing the seat track with one or more tabulated points indicative of a predetermined step size on the seat track and whether the tabulated point is a pass or fail comfortable seating position; and wherein operations further comprise generating an interactive graphical user interface configured to manage additional inputs for the CAD template, the additional inputs including a step size indicative of a desired step size between analysis points on the seat track, a mannequin anthropometry definition, and at least one posture comfort angle definition.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is generally directed to systems and methods for automatic postural comfort analysis of vehicle occupants. The system generates and positions various percentile mannequins (e.g., 95th male, 50th all, 5th female, customized human populations, etc.) in a given vehicle interior environment (e.g., sedan, SUV, etc.) and automatically outputs comfortable occupant seating locations, for example, to be utilized in a downstream process to meet comfort guidelines (e.g., Federal, corporate, industry, etc.).

In one example implementation, a CAD software provides a fully articulated customizable mannequin system including size and body segments, embedded rules and parameters to alter mannequin attributes to represent different population percentiles, parameters to define comfort limits for the articulation of each human mannequin joint, and built-in vehicle components to define the vehicle environment. An interactive user interface manages the configuration and execution of the postural comfort analysis with a code-free user interface to communicate the intended interaction with the parametric model in the CAD environment. A custom script macro with a heuristic algorithm drives the automatic execution of the postural comfort analysis. Although operation is described with vehicle interior systems (e.g., seat travel, floor, pedal, steering wheel and column, etc.), other vehicle systems such as body and exterior may be interacted for further analysis (e.g., reach, vision and clearance, seat design, etc.).

Figure 1:
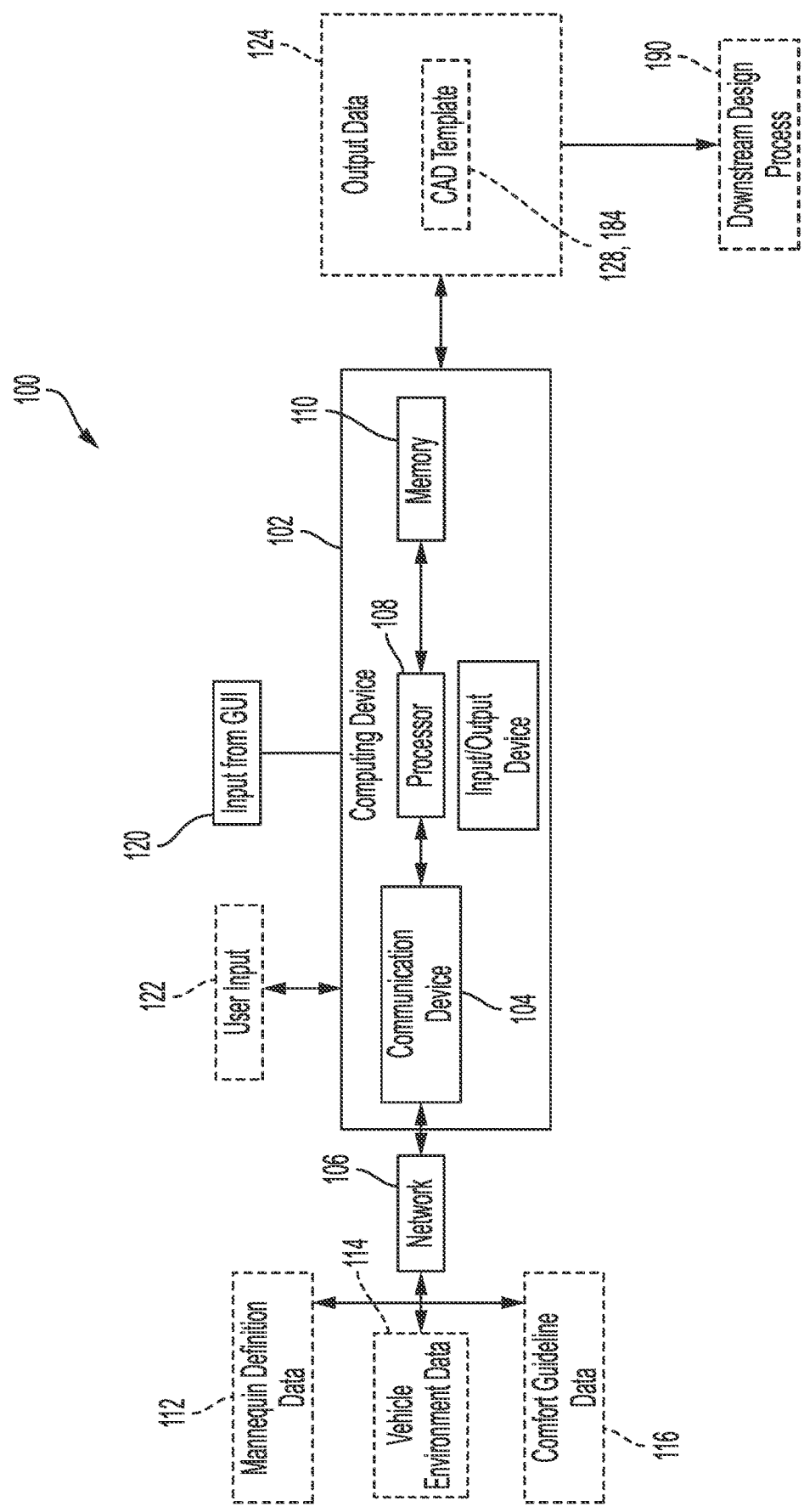
FIG. 1 a functional block diagram of an example postural comfort analysis system, according to the principles of the present application.

Referring to FIG. 1, a functional block diagram of an example postural comfort analysis system 100 is shown according to the principles of the present disclosure. In the example embodiment, the system 100 includes a computing device 102 having a communication device 104 (e.g., a wireless transceiver) configured for communication via a network 106, a processor 108 configured to control operation of the computing device 102, and a memory 110. The network 106 can be a cellular network, a computing network (LAN, the Internet, etc.), or some combination thereof. The term "processor" as used herein can refer to both a single processor and two or more processors operating in a parallel or distributed architecture. The memory 110 can be any suitable storage medium (e.g., a non-volatile memory, and/or a cloud based database such as an external network or server). In one implementation, the memory 110 stores instructions executable by the processor 108 to cause the computing device 102 to perform at least a portion of the disclosed techniques.

In the example embodiment, the memory 110 stores a pre-programmed algorithm, mannequin definition data 112, vehicle environment input data 114, and vehicle occupant comfort guideline data 116. An input/output device 118 such as, for example, a display or touch screen, is part of or in signal communication with the computing device 102 and is configured to generate and provide an interactive graphical user interface (GUI) 120 to facilitate inputting user input data 122 into the computing device 102. The processor 108 processes the mannequin definition data 112, vehicle environment input data 114, the vehicle occupant comfort guideline data 116, the user input data 122 via the pre-programmed algorithm, and additional input data from GUI 120, and automatically displays output data 124, for example, as a generated postural comfort analysis model, as described herein in more detail.

In an example operation of the postural comfort analysis system 100, computing device 102 receives the mannequin definition data 112, vehicle environment input data 114, and vehicle occupant comfort guideline data 116 and, based at least partly thereon, generates a template 128 in a CAD model format (see also FIG. 2), as described herein in more detail. In the example embodiment, the template 128 thus contains a fully constrained mannequin, vehicle reference geometry, and comfort measures/angles and embedded guidelines. In some cases, the template 128 is fully parametric-based and rule based.

Figure 2:
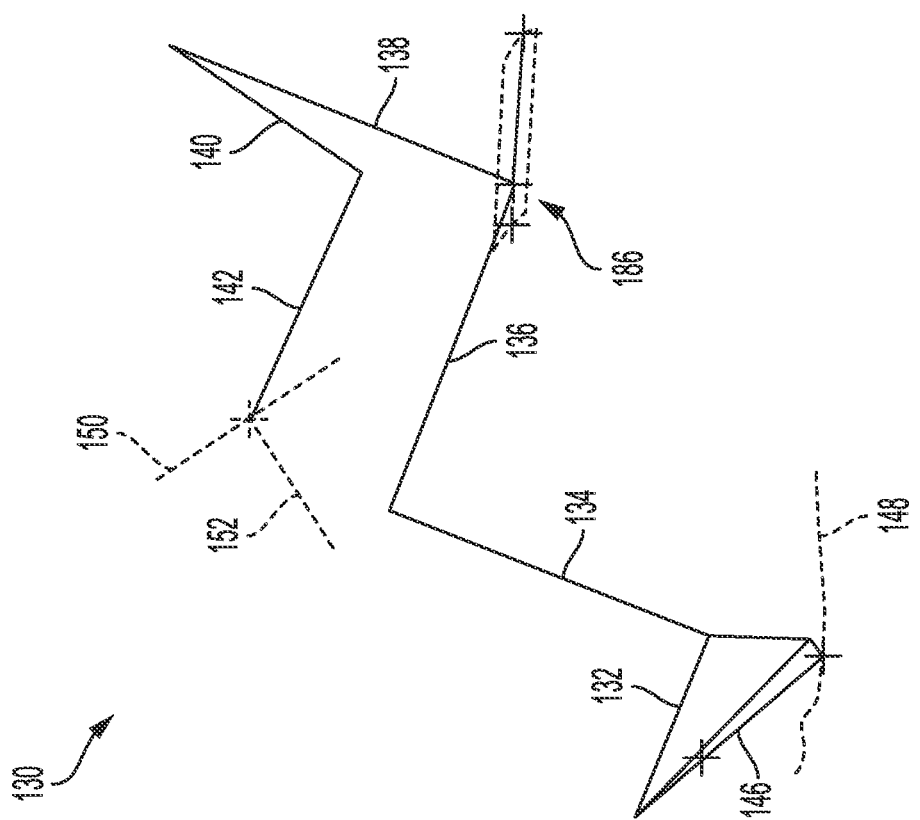
FIG. 2 illustrates an example graphical mannequin model that is generated by the system of FIG. 1, according to the principles of the present application.

With additional reference to FIG. 2, in the example embodiment, the mannequin definition data 112 includes a fully articulated 2D stick model 130 to represent 3D mannequin body segments in the CAD template 128 including foot 132, lower leg 134, upper leg 136, torso 138, upper arm 140, and lower arm 142 representative of a vehicle occupant. It will be appreciated that additional mannequin complements may be added to the model 130 such as, for example, hands and eyes. In one example, predetermined default mannequin sizes are provided such as, for example, a 95th percentile male, 50th percentile all, and 5th percentile female. However, custom mannequin size can be input from the GUI 120, as described herein in more detail.

Figure 3:
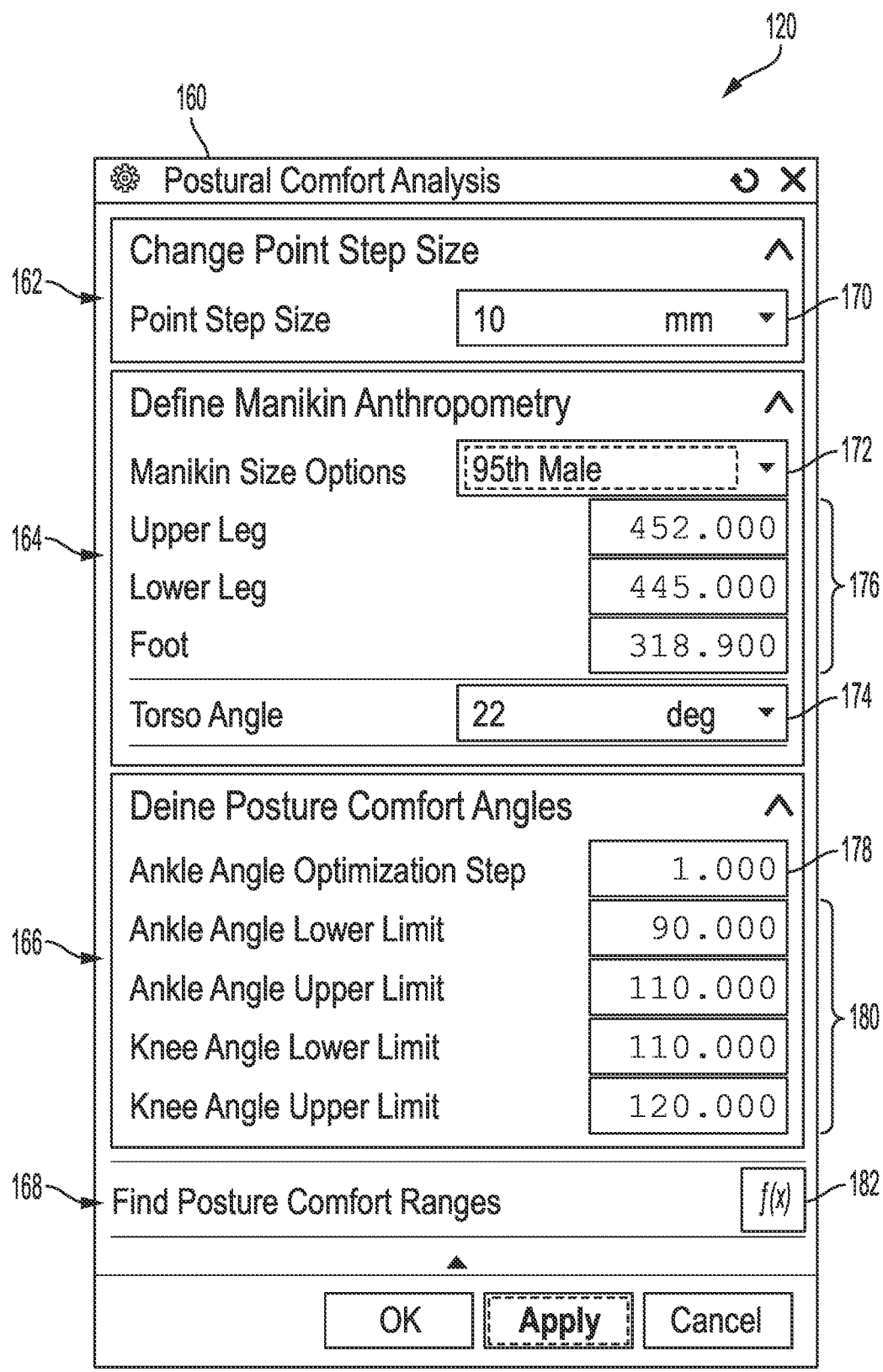
FIG. 3 is an example graphical user interface generated by the system of FIG. 1, according to the principles of the present application.

In the example embodiment, the vehicle environment input data 114 includes two-way seat travel (fore/aft) and/or four-way seat travel (fore/aft, up/down), but other seat travel configurations are envisioned. Additional vehicle environment input data 114 includes an accelerator pedal 146, a floor curve 148, a steering wheel 150, and a steering column 152 are provided as defaults, but it will be appreciated that additional vehicle components can be included. The vehicle occupant comfort guideline data 116 is any desired data relating vehicle occupant comfort guidelines such as, for example, industry mandated guidelines or comfort guideline data described in publications such as Alvin R. Tilley & Henry Dreyfuss Associates. The Measure of Man and Woman: Human Factors in Design. New York: Wiley, 2002. In one example, user inputs include comfort ranges for ankle angle, knee angle, torso angle, and elbow angle, With additional reference to FIG. 3, the computing device 102 is configured to process the data 112, 114, 116 to generate the CAD template 128, and subsequently provide GUI 120 for optional customization. In the example embodiment, GUI 120 provides a code-free user interface to manage inputs for the CAD template 128, and includes a user interface window 160 with a Change Point Step Size section 162, a Define Mannequin Anthropometry section 164, a Define Posture Comfort Angles section 166, and a Find Posture Comfort Ranges section 168.

In the example embodiment, the Change Point Step Size section 162 provides a dropdown box 170 configured to set a desired step size between analysis points on the seat track for automatic digitizing thereof. The Define Mannequin Anthropometry section 164 enables mannequin size to be adjusted based on human populations. In the illustrated example, section 164 includes a dropdown box 172 configured to set a desired mannequin size, and a field 174 configured to set a desired torso angle for the mannequin. Form fields 176 are provided to make adjustments to the size of various parts of the mannequin model size set in drop-down box 172, including, but not limited to, foot 132, lower leg 134, and upper leg 136. The Define Posture Comfort Angles section 166 provides a form field 178 to set a desired Ankle Angle Optimization Step for examining angles of articulation of the mannequin joints. Form fields 180 are provided to make adjustments to comfort limits such as, for example, upper and lower ankle angle limits and upper and lower knee angle limits. Find Posture Comfort Ranges section 168 provides a command button 182 to automatically run the pre-programmed algorithm to identify comfortable seating locations on the seat track for vehicle occupants based on the stored data.

Figure 4:
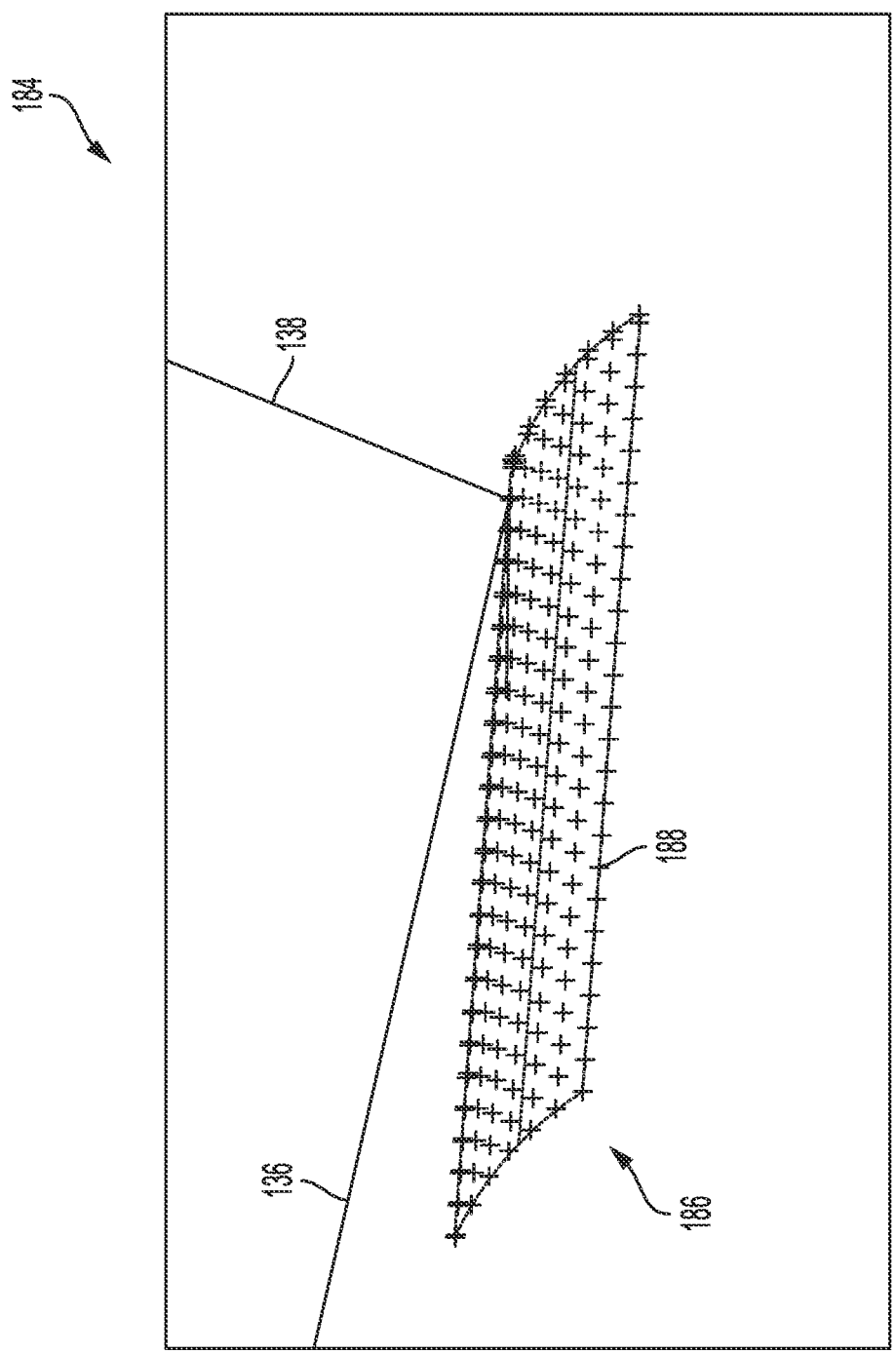
FIG. 4 illustrates an example graphical seat track with tabulated values generated by the system of FIG. 1, according to the principles of the present application.

As shown in FIG. 4, in the example embodiment, the computing device 102 clones the CAD template 128 into a new template 184 based on the mannequin definition data 112, vehicle environment input data 114, the vehicle occupant comfort guideline data 116, and the user input data 122. Once the command button 182 is selected on the GUI 120, the computing device 102 runs the algorithm and automatically digitizes and/or displays the seat track 186 with tabulated points 188 (e.g., corresponding to the chosen point step size) and subsequently evaluates at each tabulated point whether the mannequin is seated at a comfortable location. In this way, the computing device 102 automatically outputs pass/fail comfortable seating locations, for example, by shading pass locations a first color and shading fail locations a second color, and automatically outputs posture angles as output data 124, for example, to be utilized in downstream design processes 190 (FIG. 1).

The postural comfort analysis system 100 advantageously allows analysis to be run for a desired range of percentile statures, while also providing modification of anthropometry to reflect users in specific parts of the world. As described, the system 100 automatically determines a range of appropriate positions for each stature, defines 2D mannequins in the vehicle environment utilizing the previously obtained positions to locate the mannequins, performs vision analysis of a new component with each mannequin using existing functionality, and allows selective modification of components for additional analyses.

The postural comfort analysis system 100 is particularly useful for situations in which a new component is designed for a vehicle as part of the driver primary controls, which must be visible to drivers of all statures to ensure desired operation of the vehicle. Rather than performing typically expensive and time-consuming user testing with prototype parts, the system quickly utilizes input data to automatically provide a postural comfort analysis. It will be appreciated that such analyses are useful for additional visibility studies (e.g., radio control, gear shifter, etc.), driver reach studies (e.g., steering wheel and pedals, interior controls, etc.), clearance studies (e.g., evaluate head clearance), and seat design.

Figure 5:
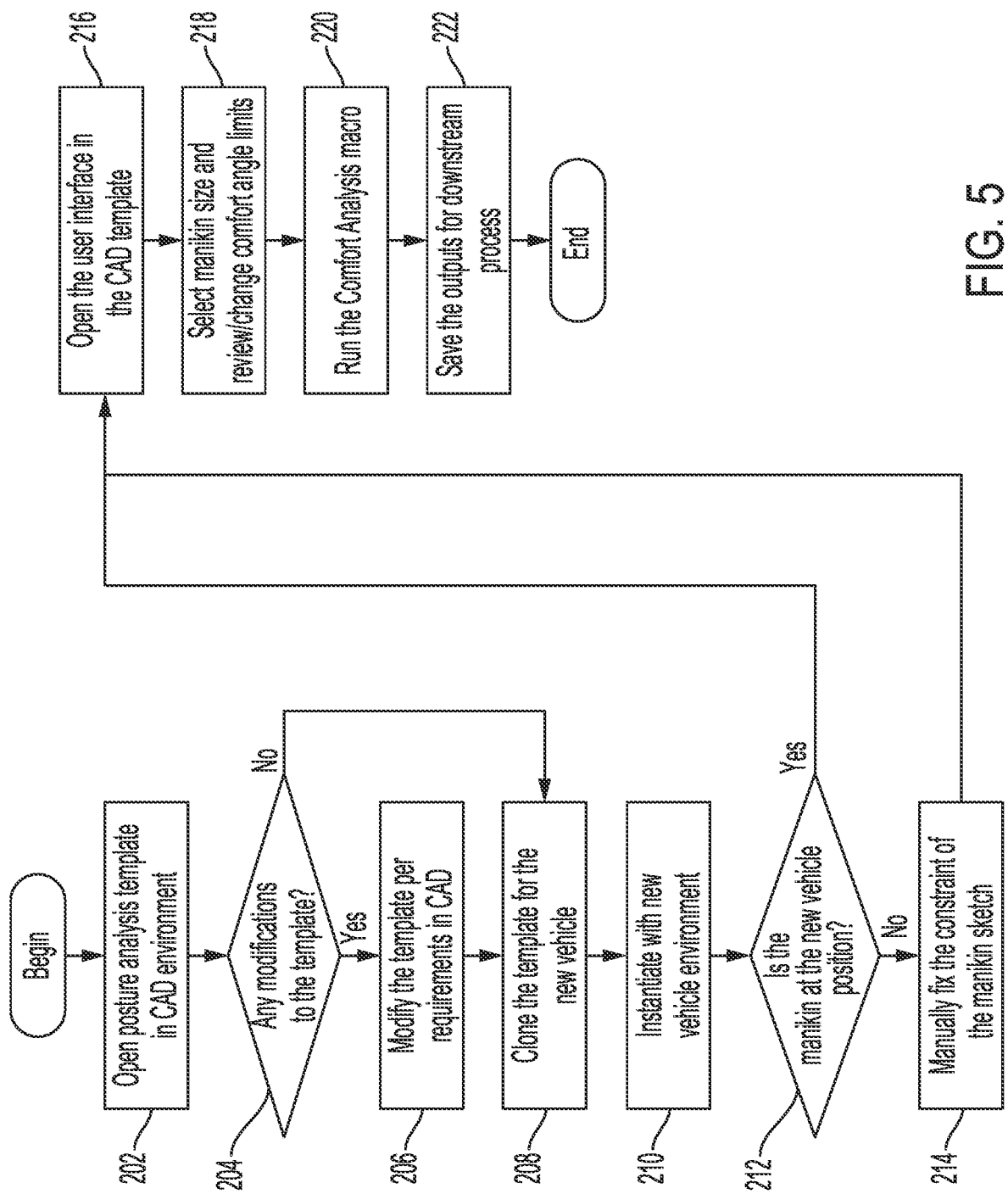
FIG. 5 is a flow diagram of an example method of performing a postural comfort analysis, according to the principles of the present application.

With specific reference to FIG. 5, a flow diagram of an example method 200 for performing a postural comfort analysis is illustrated. The method 200 can be performed by any computing device, including but not limited to the computing device 102. The method begins at step 202 where the posture analysis CAD template 128 is opened. At step 204, the system determines if any modifications are needed to the CAD template 128, such as adding new system or mannequin body segments (e.g., radio, visor, eyes, etc.). If no, control proceeds to step 208. If yes, control proceeds to step 206 and modifies the CAD template 128 in view of the user input data 122, and then proceeds to step 208 where the system clones the CAD template 128 into the new template 184 for the new analysis.

At step 210, the new template 184 is instantiated with the vehicle environment input data 114. At step 212, the system determines if the mannequin is disposed at the same location as the new vehicle position. If yes, control proceeds to step 216. If no, control proceeds to step 214 and a user manually fixes the constraints of the mannequin model 130 to move the mannequin to the new vehicle location. At step 216, the GUI 120 is opened and, at step 218, mannequin size and comfort angle limits are selectively chosen/adjusted via Define Mannequin Anthropometry section 164. At step 220, the postural comfort analysis algorithm is run via the Find Posture Comfort Ranges section 168 to automatically digitize the seat track 186 with the tabulated points 188 to identify pass/fail comfortable seat locations (e.g., via different colors). At step 222 the output data 124 is saved, for example in memory 110, for utilization in downstream processes 190.

Figure 6:
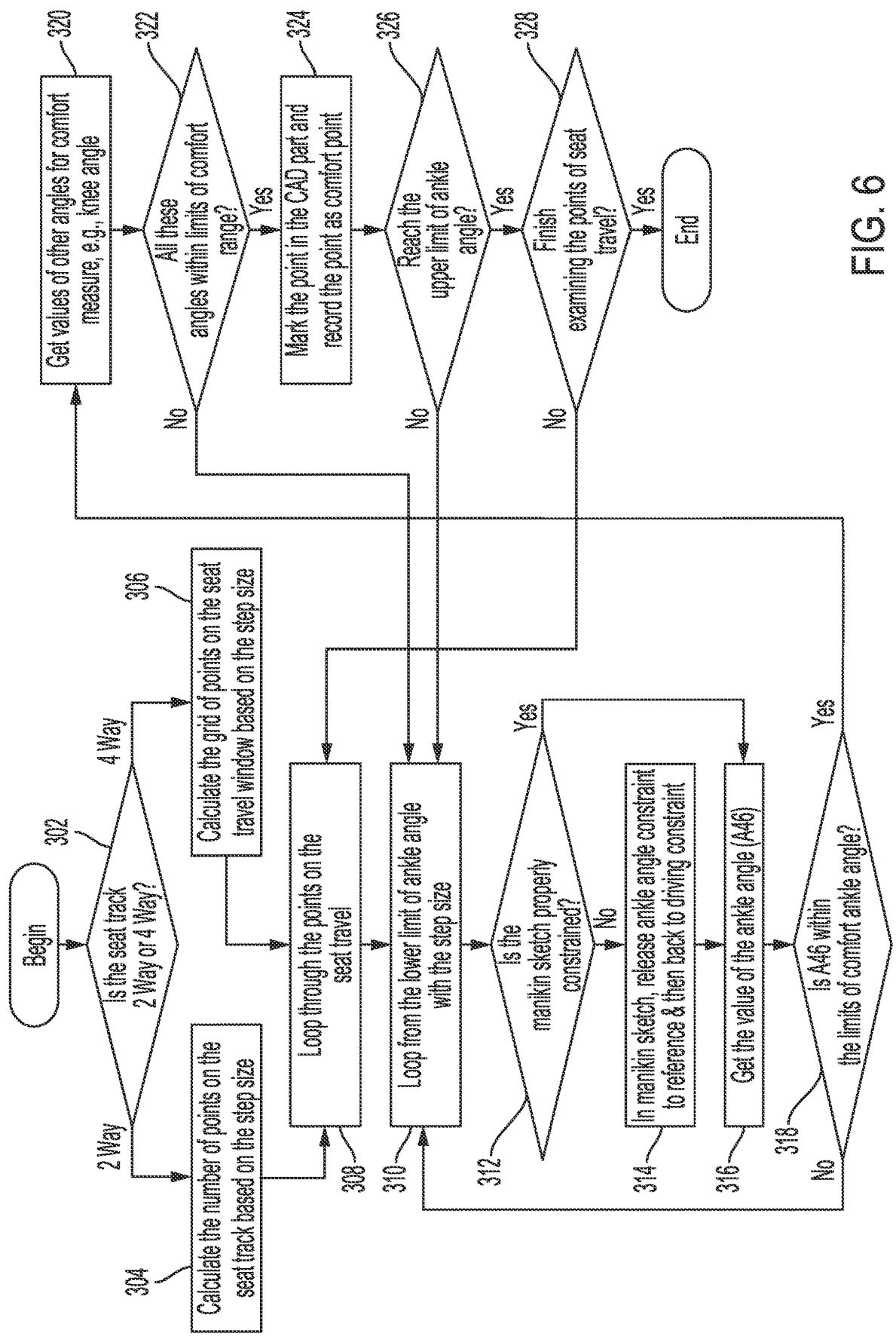
FIG. 6 is a flow diagram of an example method of running a pre-programmed algorithm of the system shown in FIG. 1 to identify comfortable seating locations for vehicle occupants on a seat track, according to the principles of the present application.

With specific reference to FIG. 6, a flow diagram of an example method 300 of system 100 running the pre-programmed algorithm to identify comfortable seating locations for vehicle occupants on the seat track 186 is illustrated. The method 300 can be performed by any computing device, including but not limited to the computing device 102. The method begins at step 302 where the system determines if seat track 186 is a two-way seat track or a four-way seat track. If the seat track 186 is a two-way seat track, the method proceeds to step 304 and the number of tabulated points 188 on the seat track 186 is calculated based on the input into Change Point Step Size section 162. The method then proceeds to step 308.

If the seat track 186 is a four-way seat track, the method proceeds to step 306 and the number of tabulated grid points 188 of a seat travel window are calculated based on the input into Change Point Step Size section 162. At step 308, the system loops through the tabulated points 188 of the seat travel. At step 310, the system loops from the lower limit of ankle angle with the inputted step size. At step 312, the system determines if the mannequin model 130 is properly constrained (e.g., a fully constrained model). If yes, the method proceeds to step 316. If no, at step 314, the ankle angle constraint to reference is released on the mannequin model 130 and then set back to the driving constraint.

At step 316, the value of the ankle angle is determined. At step 318, the system determines if the determined ankle angle is within the limits of the comfort ankle angle (e.g., of the guideline data 116). If no, the method returns to step 310. If yes, the method proceeds to step 320 where the system obtains values of other angles for comfort measure (e.g., knee angle). At step 322, the system determines if all the angles for comfort measure are within the limits of the comfort range. If no, the method returns to step 310. If yes, at step 324, the particular tabulated point 188 is marked on the model of the seat track 186 as a pass/fail comfort point (e.g., a particular color). At step 326, the system determines if the upper limit of the ankle angle of the Define Posture Comfort Angles section 166 is reached. If no, the method returns to step 310. If yes, at step 328, the system determines if it is finished examining the points of seat travel. If no, the method returns to step 308. If yes, the method ends.

Described herein are systems and methods to quickly assess and analyze various vehicle occupant package configurations to ensure comfortable occupant seating positions. Mannequin and vehicle environments are built in a CAD template and can be reused for different human populations and vehicle environments. Embedded rules, guidelines, and methodologies for comfort analysis can be quickly updated to incorporate the latest changes. An algorithm or script macro allows for automated execution of the comfort analysis. The systems advantageously find the range of the seat travel window where the seated mannequin has a comfortable posture where its comfort angles are within the upper and lower limits defined by comfort guidelines, enable mannequin population percentiles and vehicle environments to be easily changed, and provide the capability to automatically visualize, review, and validate designs in an integrated environment without having to switch environments.

As such, the described systems utilize inputs of mannequin definition, vehicle environment, postural comfort guidelines, and user inputs to develop a knowledge-based postural comfort analysis template. The system then develops an interface to automate the finding of comfortable seating locations on the seat track for vehicle occupants, automatically digitizes the seat track with tabulated points, and evaluates each point to determine if the mannequin is seated at a comfortable location for the downstream design process. Advantageously, this allows various vehicle occupant package configurations to be quickly assessed.

It will be appreciated that the term "controller" or "module" or "computing device" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A computer-implemented method of analyzing postural comfort of an occupant seated on a seat track of a vehicle, the method comprising:
    obtaining, at a computing device having one or more processors, a first set of data corresponding to a mannequin definition;
    obtaining, at the computing device, a second set of data corresponding to reference geometry of an environment of the vehicle;
    obtaining, at the computing device, a third set of data corresponding to vehicle occupant comfort guidelines;
    generating, at the computing device, a CAD template with a mannequin model, vehicle reference geometry including the seat track, and occupant comfort guidelines based on the first set of data, the second set of data, and the third set of data;
    automatically digitizing, by the CAD template and the computing device, the seat track with a plurality of tabulated points indicative of a predetermined step size on the seat track; and
    evaluating, by the CAD template and the computing device, each point of the plurality of tabulated points to determine whether one or more locations on the seat track are a comfortable seating position for the occupant in view of the first set of data and the third set of data.

2. The computer-implemented method of claim 1, further comprising, at the computing device, visually identifying on the CAD template each of the one or more tabulated points as either a pass/fail comfortable seating position.

3. The computer-implemented method of claim 2, further comprising automatically outputting, at the computing device, one or more comfortable seating locations and posture angles as data for use in a downstream design process.

4. The computer-implemented method of claim 1, further comprising generating, at the computing device, an interactive graphical user interface configured to manage additional inputs for the CAD template.

5. The computer-implemented method of claim 4, wherein the additional inputs comprise:
    a desired step size indicative of the predetermined step size between analysis points on the seat track;
    a mannequin anthropometry definition; and
    at least one posture comfort angle definition.

6. The computer-implemented method of claim 5, wherein the mannequin anthropometry definition includes a population percentile size and a torso angle.

7. The computer-implemented method of claim 5, wherein the comfort angle definition includes:
    an ankle angle lower limit;
    an ankle angle upper limit;
    a knee angle lower limit; and
    a knee angle upper limit.

8. The computer-implemented method of claim 1, wherein the first set of data corresponding to the mannequin definition includes a fully articulated model to represent mannequin body segments.

9. The computer-implemented method of claim 8, wherein the mannequin body segments include a foot, a lower leg, an upper leg, a torso, and an upper arm, of the representative vehicle occupant.

10. The computer-implemented method of claim 1, wherein the second set of data corresponding to reference geometry of an environment of the vehicle includes a seat travel of a seat to define the seat track.

11. The computer-implemented method of claim 10, wherein the second set of data further includes reference geometry of an accelerator pedal, a floor curve, a steering wheel, and a steering column of the vehicle.

12. The computer-implemented method of claim 1, wherein the third set of data corresponding to vehicle occupant comfort guidelines includes one or more joint angles of the vehicle occupant.

13. The computer-implemented method of claim 12, wherein the one or more joint angles of the vehicle occupant includes an ankle joint angle, a knee joint angle, a hip joint angle, a shoulder joint angle, an elbow joint angle, and a wrist joint angle.

14. A computing device, comprising:
    one or more processors; and a non-transitory computer-readable storage medium having a plurality of instructions stored thereon, which, when executed by the one or more processors, cause the one or more processors to perform operations comprising:
- obtain a first set of data corresponding to a mannequin definition;
- obtain a second set of data corresponding to reference geometry of an environment of the vehicle;
- obtain a third set of data corresponding to vehicle occupant comfort guidelines;
- generate a CAD template with a mannequin model, vehicle reference geometry including a seat track, and comfort guidelines based on the first set of data, the second set of data, and the third set of data;
- automatically digitize, with the CAD template, the seat track with a plurality of tabulated points indicative of a predetermined step size on the seat track; and
- evaluate each point of the plurality of tabulated points to determine whether one or more locations on the seat track are a comfortable seating position for the occupant in view of the first set of data and the third set of data.

15. The computing device of claim 14, wherein the operations further comprise visually identifying on the CAD template whether each tabulated point is a pass or fail comfortable seating position.

16. The computing device of claim 14, wherein operations further comprise generating an interactive graphical user interface configured to manage additional user inputs for the CAD template, the additional inputs comprising:
- a desired step size indicative of the predetermined step size between analysis points on the seat track;
- a mannequin anthropometry definition; and
- at least one posture comfort angle definition.

17. A computer-implemented method of analyzing postural comfort of an occupant seated on a seat track of a vehicle, the method comprising:
- obtaining, at a computing device having one or more processors, a first set of data corresponding to a mannequin definition for various human sizes;
- obtaining, at the computing device, a second set of data corresponding to reference geometry of an environment of the vehicle;
- obtaining, at the computing device, a third set of data corresponding to vehicle occupant comfort guidelines, including comfort ranges for an ankle angle, a knee angle, a torso angle, and an elbow angle;
- generating, by the computing device, a CAD template with a mannequin model, vehicle reference geometry including the seat track, and occupant comfort guidelines based on the first set of data, the second set of data, and the third set of data;
- generating, by the computing device, an interactive graphical user interface configured to manage additional inputs for the CAD template;
- receiving, via the graphical user interface, user input to (i) adjust the mannequin definition to a desired human size, and (ii) define a desired step size between analysis points on the seat track;
- digitizing, by the CAD template and the computing device, the seat track with a plurality of tabulated points indicative of the desired step size on the seat track;
- executing, by the CAD template and the computing device, a postural comfort analysis to determine whether one or more locations on the seat track corresponding to the plurality of tabulated points are a comfortable seating position for the occupant in view of the first set of data, the third set of data, and the user input.

* * * * *